(12) United States Patent
Roberts et al.

(10) Patent No.: US 8,407,144 B2
(45) Date of Patent: Mar. 26, 2013

(54) VEHICULAR-BASED TRANSACTIONS, SYSTEMS AND METHODS

(75) Inventors: Melanie Roberts, Elizabeth, CO (US); Dianna Lyons, Highlands Ranch, CO (US)

(73) Assignee: The Western Union Company, Englewood, CO (US)

( * ) Notice: Subject to any disclaimer, the term of this patent is extended or adjusted under 35 U.S.C. 154(b) by 243 days.

(21) Appl. No.: 12/727,079

(22) Filed: Mar. 18, 2010

(65) Prior Publication Data

US 2011/0231310 A1 Sep. 22, 2011

(51) Int. Cl.
G06Q 40/00 (2012.01)
G06Q 20/00 (2012.01)
G06Q 30/00 (2012.01)

(52) U.S. Cl. ............ 705/40; 705/17; 705/18; 705/26.1; 705/26.35; 705/26.9; 705/35; 705/38; 705/39; 705/44

(58) Field of Classification Search ............ 705/38, 705/39, 40
See application file for complete search history.

(56) References Cited

U.S. PATENT DOCUMENTS

| | | | | |
|---|---|---|---|---|
| 4,189,708 A * | 2/1980 | Bryll | ............................ | 307/10.3 |
| 5,574,424 A * | 11/1996 | Nguyen | .................... | 340/426.11 |
| 5,694,322 A | 12/1997 | Westerlage et al. | | |
| 5,819,234 A | 10/1998 | Slavin et al. | | |
| 5,970,481 A | 10/1999 | Westerlage et al. | | |
| 6,151,549 A | 11/2000 | Andrews et al. | | |
| 6,169,552 B1 | 1/2001 | Endo et al. | | |
| 6,181,955 B1 | 1/2001 | Dartois | | |
| 6,314,401 B1 * | 11/2001 | Abbe et al. | .................... | 704/273 |
| 6,526,335 B1 * | 2/2003 | Treyz et al. | ....................... | 701/1 |
| 6,574,603 B1 * | 6/2003 | Dickson et al. | ................. | 705/15 |
| 6,606,543 B1 * | 8/2003 | Sproule et al. | ..................... | 701/1 |
| 6,711,474 B1 | 3/2004 | Treyz et al. | | |
| 6,816,707 B1 * | 11/2004 | Barker et al. | ................ | 455/41.2 |
| 7,014,106 B2 | 3/2006 | Nakajima | | |
| 7,110,570 B1 * | 9/2006 | Berenz et al. | ................ | 382/104 |
| 7,158,876 B2 | 1/2007 | Crook | | |
| 7,734,500 B1 | 6/2010 | Allen et al. | | |
| 7,778,894 B2 | 8/2010 | Monsor et al. | | |
| 7,818,204 B2 | 10/2010 | Solomon | | |
| 7,970,644 B2 | 6/2011 | Hedley et al. | | |
| 2001/0055165 A1 * | 12/2001 | McCarthy et al. | ............ | 359/839 |
| 2002/0169641 A1 | 11/2002 | Wallace, Jr. | | |
| 2003/0020634 A1 | 1/2003 | Banerjee et al. | | |
| 2003/0069784 A1 * | 4/2003 | Banerjee et al. | ................ | 705/13 |
| 2004/0067752 A1 * | 4/2004 | Himmelstein | ............. | 455/422.1 |
| 2004/0110472 A1 * | 6/2004 | Witkowski et al. | .......... | 455/41.2 |
| 2005/0012599 A1 * | 1/2005 | DeMatteo | .................. | 340/425.5 |
| 2005/0046584 A1 * | 3/2005 | Breed | ...................... | 340/825.72 |
| 2005/0090279 A9 * | 4/2005 | Witkowski et al. | ........ | 455/550.1 |

(Continued)

FOREIGN PATENT DOCUMENTS

EP 1320075 A2 6/2003

*Primary Examiner* — Gregory Johnson
(74) *Attorney, Agent, or Firm* — Kilpatrick Townsend & Stockton, LLP

(57) ABSTRACT

Various systems and methods are described for conducting and staging money transfer transactions from a vehicle. The systems and methods may include using a wireless transmitter on board the vehicle for wirelessly communicating with a money transfer system. Also, a user-input device integrated with the vehicle's navigation system, entertainment system, and/or climate system may be used. Using the wireless transmitter, the user-input device may interface with the money transfer system. Also, one or more identity authentication devices may be integrated with the vehicle that collect information to authenticate a user's identity.

23 Claims, 5 Drawing Sheets

U.S. PATENT DOCUMENTS

| | | | |
|---|---|---|---|
| 2005/0099320 A1* | 5/2005 | Nath et al. | 340/933 |
| 2005/0131607 A1* | 6/2005 | Breed | 701/45 |
| 2005/0156714 A1* | 7/2005 | McCarthy et al. | 340/425.5 |
| 2005/0195783 A1* | 9/2005 | Basir | 370/338 |
| 2005/0226472 A1* | 10/2005 | Komura | 382/118 |
| 2006/0215884 A1* | 9/2006 | Ota | 382/118 |
| 2007/0136083 A1* | 6/2007 | Simon et al. | 705/1 |
| 2008/0069403 A1* | 3/2008 | Breed | 382/104 |
| 2008/0208680 A1* | 8/2008 | Cho | 705/13 |
| 2008/0208701 A1* | 8/2008 | Betancourt et al. | 705/26 |
| 2009/0024458 A1 | 1/2009 | Palmer | |
| 2009/0024525 A1* | 1/2009 | Blumer et al. | 705/41 |
| 2009/0248538 A1* | 10/2009 | Taylor | 705/26 |
| 2009/0289780 A1* | 11/2009 | Tenorio-Fox | 340/425.5 |
| 2010/0057624 A1* | 3/2010 | Hurt et al. | 705/76 |
| 2010/0076878 A1 | 3/2010 | Burr et al. | |
| 2010/0082230 A1* | 4/2010 | Hong et al. | 701/201 |
| 2010/0088127 A1* | 4/2010 | Betancourt et al. | 705/5 |
| 2010/0207754 A1* | 8/2010 | Shostak et al. | 340/450 |
| 2010/0253504 A1* | 10/2010 | Lliteras et al. | 340/539.11 |
| 2010/0274570 A1* | 10/2010 | Proefke et al. | 705/1.1 |
| 2010/0280956 A1* | 11/2010 | Chutorash et al. | 705/64 |
| 2011/0035294 A1* | 2/2011 | Mizrah | 705/26.42 |
| 2011/0218896 A1 | 9/2011 | Tonnon et al. | |
| 2011/0231310 A1* | 9/2011 | Roberts et al. | 705/40 |

* cited by examiner

VEHICULAR-BASED TRANSACTIONS, SYSTEMS AND METHODS

BACKGROUND OF THE INVENTION

With the advent of inexpensive electronics and consumers' willingness to spend increasing sums on vehicles, the amount of electronics on-board vehicles has increased significantly in recent years. Such technology has been aimed at providing consumers with GPS-based navigation systems, live traffic reports, real-time access to emergency services, and satellite radio, to name only a few examples.

However, certain functions may not have been implemented in vehicles, possibly due to the cost of additional hardware and/or issues with regulatory compliance. A money transfer is a transaction that typically has required the use of a computer or traveling to an agent location of a money transfer service provider. This may have been at least partially due to the legal requirement of money transfer service providers to authenticate the identity of the person conducting a money transfer.

The invention solves these and other problems.

BRIEF SUMMARY OF THE INVENTION

An on-board vehicle money transfer system may have the ability to interact with a money transfer service provider and authenticate the identity of the user conducting the money transfer transaction. In some embodiments, a user can complete an entire money transfer transaction from a vehicle. In such embodiments, the user may interact with a customer service representative of a money transfer service provider using a built-in microphone and the vehicle's sound system (in some embodiments, the user may interact with an operator working on behalf of another entity, who in turn, interacts with the money transfer service provider or a representative of the money transfer service provider). The user may then converse with the customer service representative to conduct a money transfer transaction. Additionally, various systems on-board the vehicle may be used to positively authenticate the identity of the user. For example, an integrated camera may take a picture of the user. A device in the driver's (or passenger's) seat may be used to determine the user's weight. The user may be required to input a password via an input system of the vehicle, such as the vehicle's navigation system or entertainment (e.g., radio) system. The vehicle may have the ability to collect a voiceprint from the user and analyze it on-board or transmit it to the money transfer service provider. Further, such systems may be used in combination. For example, for a user to conduct a money transfer transaction from her vehicle, she may need to have her identity confirmed by multiple sources, such as a camera, voiceprint, and weight.

In some embodiments, a user may not complete an entire money transfer transaction from the vehicle. Rather, she may "stage" the transaction from her vehicle and complete it at a later time and/or location. The user may provide transaction information in the vehicle, such as her name, the recipient's name, and the amount of transaction. She may then travel to an agent location to be positively identified or present cash to initiate the transaction. Alternatively, the transaction may be staged before the user enters the vehicle, such as at a home computer, and payment may be executed from the vehicle.

In some embodiments, an integrated vehicle-based system for conducting a money transfer transaction and for monitoring regulatory compliance is described. The system may include a vehicle, the vehicle comprising a navigation system or entertainment system. The system may also include a wireless transmitter on board the vehicle for wirelessly communicating with a money transfer system. Also, the system may include a user-input device integrated with the navigation system or entertainment system, wherein the user-input device interfaces with the money transfer system using the wireless transmitter. Further, a first identity authentication device integrated with the vehicle that collects information confirming a user identity may be present.

In some embodiments, a method for gathering sufficient information using an integrated vehicle system to authenticate a user's identity is described. The method may include providing a vehicle with integrated information gathering systems. The method may also include receiving, by an input system of the vehicle, a request to conduct a money transfer transaction from a user. Further, the method may include using a first identity-authentication system to authenticate the user's identity; and confirming, using a second identity-authentication system, the user's identity. The first and second identity-authentication systems may be different. The method may include determining that the results of the first authentication and the second authentication positively authenticate the user's identity. Also, the method may include transmitting at least some of the information gathered from the first identity-authentication system and at least some of the information gathered from the second identity-authentication system to a money transfer host system from the vehicle.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION OF THE INVENTION

An on-board vehicle money transfer system may allow a user to interact with a money transfer transaction provider and either complete a money transfer transaction or stage a money transfer transaction from a vehicle. The user's identity may be confirmed while she is in the vehicle using systems present in the vehicle for multiple purposes or installed for the purpose of identifying the user. Such a process of identifying the user may be sufficient to comply with the legal requirements imposed on money transfer service providers.

One or more different systems on the vehicle may be used to identify the user. A voiceprint may be gathered from the user for comparison to a previously gathered voice sample. An image of the user may be taken. A system integrated with the driver's or passenger's seat may measure the weight of the user and/or the position of the user's seat. The user may be required to type in a password, possibly using the navigation and/or entertainment system of the vehicle. Also, the vehicle may contain a computer-readable storage device that may contain information on users authorized to conduct money transfer transactions from the vehicle. For example, the storage device may specify the name of the vehicle's owner. This may be the only person authorized to conduct financial transactions from the vehicle. The storage device may also contain information on authorized users to authenticate their identities, such as a previously gathered voiceprint, an image for comparison, their weight, seat position, their driving characteristics, a password, a geographic area from which they are authorized to conduct money transfers, etc.

The ensuing description focuses on the completion of a money transfer transaction from a vehicle. However, as those with skill in the art will recognize, such systems and methods may also be used for other monetary transactions, such as transferring funds to a stored value account, bill payment, or any number of other monetary transactions.

Figure 1:
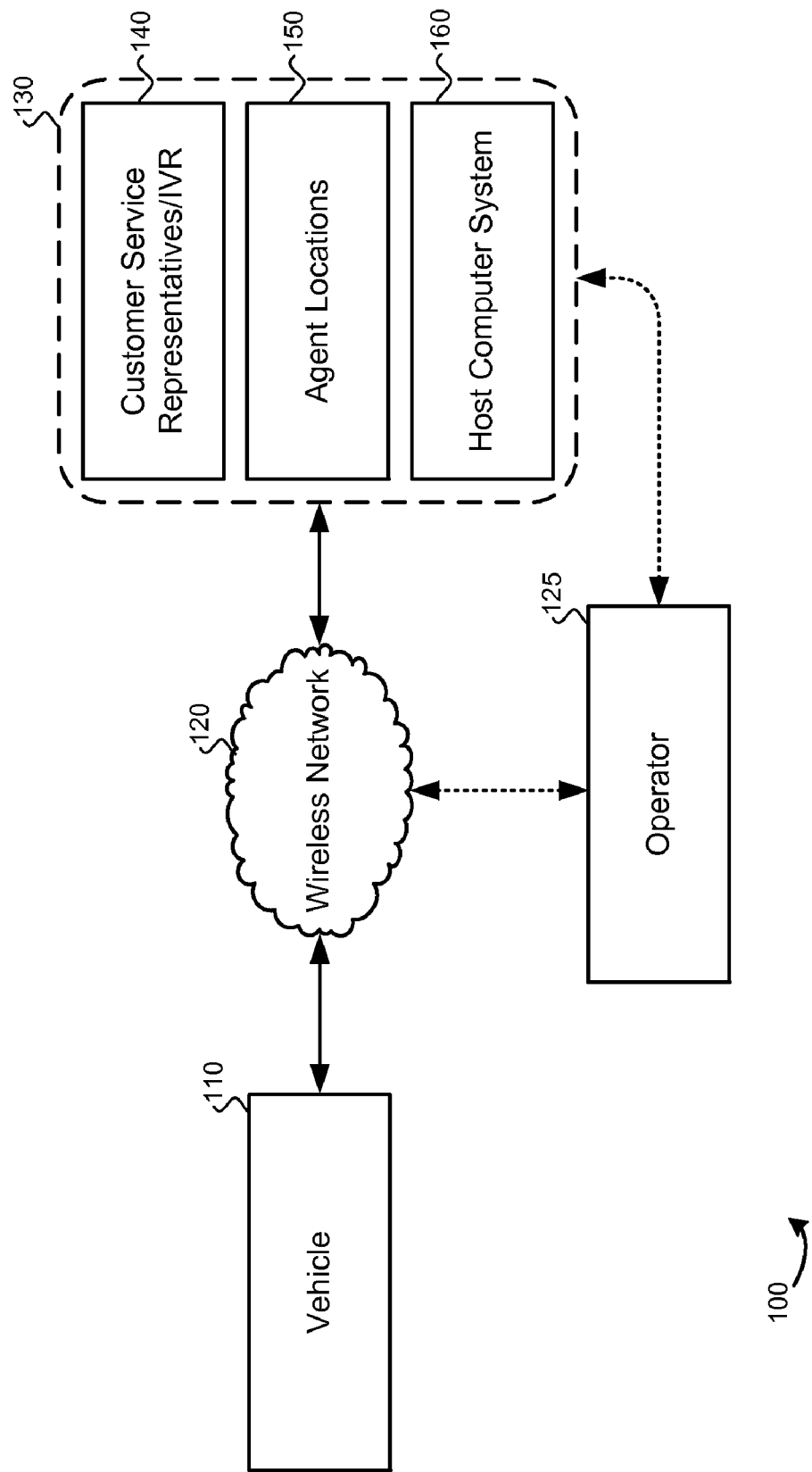
FIG. 1 illustrates a simplified block diagram of a system for interfacing a vehicle with a money transfer service provider.

FIG. 1 illustrates a simplified block diagram of a system 100 for interfacing a vehicle with a money transfer service provider. In its most basic form, the system 100 may require a vehicle 110, a wireless network 120, and a money transfer service provider 130. The vehicle 110 may be any vehicle with electrical systems, such as a car, motorcycle, truck, sport-utility vehicle, airplane, boat, etc.

Such a vehicle 110 may interact with a money transfer service provider 130 through a network, such as wireless network 120. Such a wireless network 120 may be a cellular network, such as those maintained by commercially-available cellular service providers. In some embodiments, the wireless network 120 may be a satellite network. In some embodiments, the wireless network 120 may be a specialized network maintained solely on behalf of the money transfer service provider 130. The wireless network 130 may be a hybrid wireless/wired network. For example, the wireless network 130 may interact with a vehicle through wireless communication towers and transmit data to the money transfer service provider through a different network, such as the Internet or a private intranet.

Money transfer service provider 130 may be an entity such as WESTERN UNION, or any other money transfer provider capable of wiring money transfers between multiple locations. Also, an entity such as a bank may be able to provide services similar to money transfer service provider 130. Money transfer service provider 130 may be able to interact with both vehicle-based customers and other customers through multiple avenues, such as telephonically with an interactive voice response (IVR) system or live customer service representatives 140. Such customer service representatives or an IVR system 140 may communicate with a user located in vehicle 110 through wireless network 120.

Money transfer service provider 130 may also have one or more agent locations 150. While only one agent location is illustrated for simplicity, any number of agent locations is possible. Such agent locations may be locations where an electronic kiosk or a clerk can directly interact with a user to conduct a money transfer transaction. Such agent locations may be scattered geographically in stand-alone locations, such as storefronts, or within other entities, such as gas stations or convenience stores.

Money transfer service provider 130 may also have a host computer system 160. Such a host computer system 160 may be used to conduct and manage money transfers. Such a host computer system 160 may also interact with a user by communicating with vehicle 110. It may be possible for a user in vehicle 110 to complete a money transfer transaction by interacting only with host computer system 160, and not with a customer service representative 140 or a physical agent location 150. For example, using a website the user in vehicle 110 may interact with host computer system 160. It may be possible to display such a website within the vehicle to the user.

In addition to vehicle 110 interacting directly with money transfer service provider 130 via network 120, the vehicle 110 and the user conducting the money transfer may interact with an operator 125 via network 120. Operator 125 may be affiliated with an entity separate from money transfer service provider 130. For example, operator 125 may be affiliated with an entity that provides wireless services to vehicles and users in vehicles, such as GENERAL MOTOR'S ON-STAR system. In such embodiments, the user may contact the operator 125 from vehicle 110. The operator may then conduct the money transfer transaction with money transfer service provider 130 on behalf of the user, or may place the user in contact with money transfer service provider 130. The user may interact with the operator vocally. If the operator 125 places the user in contact with money transfer service provider 130, the user may then interact with the money transfer service provider 130 using various devices described in relation to FIG. 2, and/or may continue to interact vocally.

It is also important to note, that the user may have or had contact with the money transfer service provider 130 via other channels. For example, the user may already have an account with money transfer service provider 130. This may simplify the amount of information necessary to be supplied by the user at vehicle 110 to conduct a money transfer transaction. For example, the user may create an account with the money transfer service provider 130 at an agent location 150 or remotely from a computer interacting with the host computer system 160. The user may provide the money transfer service provider with information regarding: the user's name, address, bank account numbers, loyalty account numbers, future recipients of money transfers (possibly including financial account information of the recipients), stored value accounts held by the user, etc. Such an arrangement may allow the user to provide simplified information during a transaction being conducted from vehicle 110. For example, the user may only need to specify that she wants $500 transferred to "Mary." The name "Mary" may already be associated with a more complete profile of a recipient stored at the money transfer service provider 130, including Mary's full name, her address, her phone number, and/or her bank account number. Such a profile may also exist for recurring bill payments. For example, a user may establish a profile for an entity that is due regular payments, such as a lender or utility company, to simplify recurring payments. Similarly, the vehicle may be tied to a loyalty program account held by user with the money transfer service provider 130. This account may allow the user to collect incentives, points, discounts, and/or store information to expedite money transfer transactions. The user may be able to associate such an account with vehicle 110. As those with skill in the art will understand, many other pieces of information may be provided by the user to the money transfer service provider 130 prior to a money transfer transaction being initiated from vehicle 110 to reduce the amount of information the user must provide from the vehicle.

Figure 2:
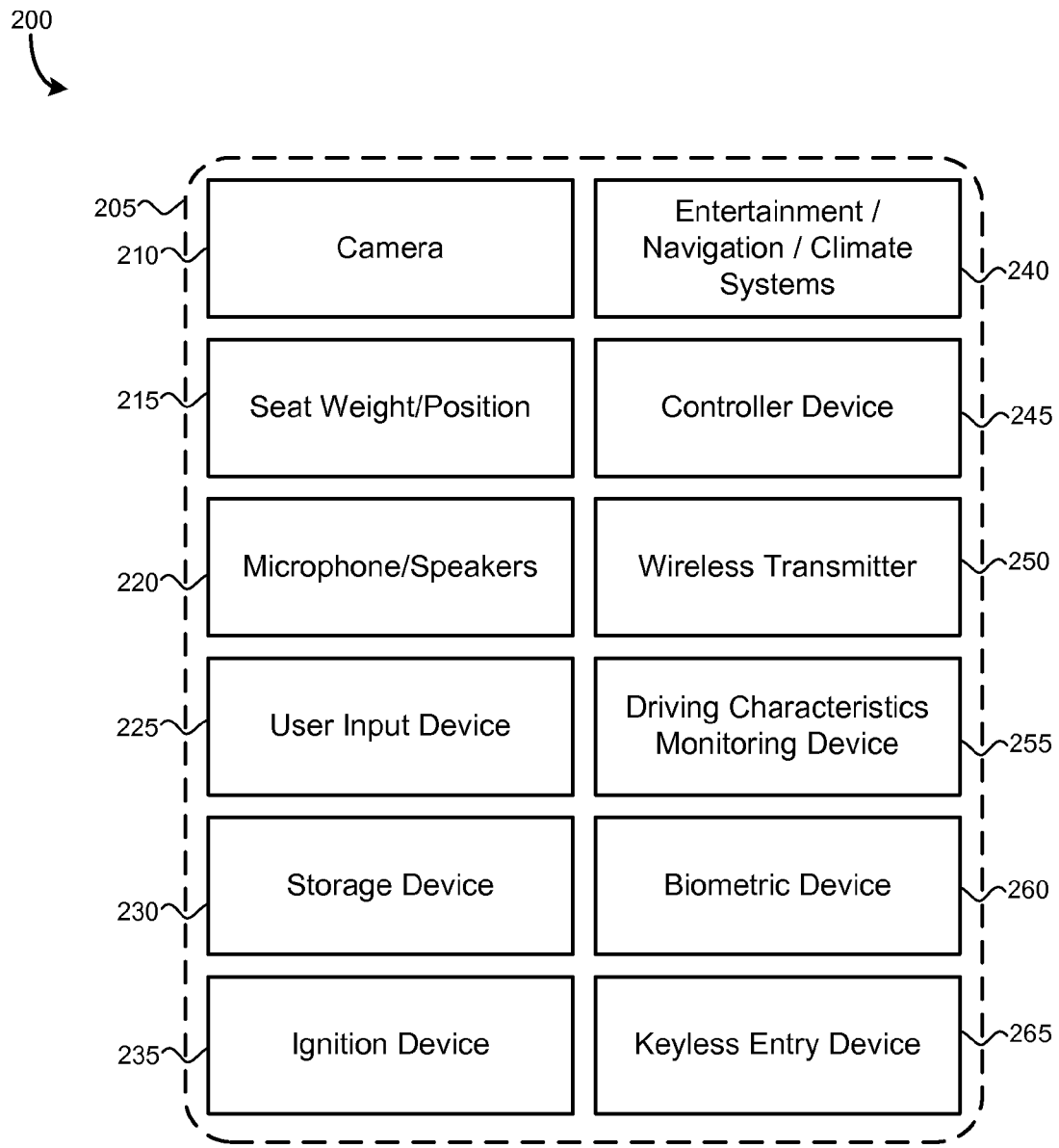
FIG. 2 illustrates a simplified block diagram of various vehicle systems that may be used to conduct a money transfer transaction.

A vehicle, such as vehicle 110, may have multiple different systems that are capable of gathering information from a user for use in conducting a money transfer transaction. FIG. 2 illustrates a simplified block diagram of a vehicle containing various vehicle systems 200 that may be used to conduct a money transfer transaction. Vehicle 205 may be vehicle 110 of FIG. 1. Alternatively, vehicle 205 may be a different vehicle from vehicle 110 of FIG. 1.

Vehicle 205 may contain a camera. The camera may be a video camera or a still picture camera. The camera may be used to take a picture and produce an image of a user attempting to conduct a money transfer. Such an image may be transmitted to the money transfer service provider and linked to a money transfer conducted by the user. The money transfer service provider may use the picture to authenticate the identity of the user, such as by comparing it to another picture on record. An image produced by the camera 210 may also be used locally at the vehicle, such as in a comparison to a locally stored image, such as in storage device 230, to authenticate the user's identity. The camera may be permanently integrated into another system of the vehicle, such as the navigation or entertainment system in the vehicle's dashboard. In some embodiments, the camera may be integrated into the vehicle's instrument cluster. It may be possible to manipulate the camera so that it can be aimed at users located in different seats within the vehicle. In some embodiments, the camera 210 may be prevented from being aimed in the direction of the driver's seat to prevent a driver from using the camera while the vehicle is being driven. In some embodiments, the camera may be a video camera such that a customer service representative of the money transfer service provider may view and interact with the user in real-time or near real-time.

A seat weight and position sensor 215 may also be incorporated with vehicle 205. Such a sensor may be a single sensor or a group of sensors. Such a sensor may be able to determine the weight of a user sitting on the seat and may be able to determine the locations of various parts of the seat. The weight of the user determined by the sensor 215 may be transmitted to the money transfer provider for comparison to a weight on record to assist in confirming the user's identity. In some embodiments, the weight of the user may be compared to a locally stored weight, such as in storage device 230, to assist in confirming the user's identity. Similarly, the position of a seat may be used to assist in determining the user's identity. A user may tend to position her seat within vehicle 205 similarly each time she enters the vehicle. This position may include the height of the seat, distance to the front of the cabin, angle of the bottom of the seat, angle of the back of the seat, position of the seat's lumbar element, or any other part of the seat that may be adjusted. Prior to allowing a money transfer transaction, it may be determined whether the user's seat is in the position associated with the user. While determining that the seat is in a different position may not be dispositive as to who is attempting to conduct a money transfer transaction, the information may be used in conjunction with other forms of identification.

If a user is attempting to conduct a money transfer transaction, she may place her seat in its usual position prior to beginning the money transfer transaction. If the seat is not close to the user's usual position during the money transfer transaction, the user may be instructed to move her seat to her usual position. When conducting her first money transfer transaction from the vehicle, the user may be asked to place her seat in the position she will use for subsequent transactions. This seat position information may be stored locally within the vehicle, such as in storage device 230, or may be transmitted to the money transfer service provider and stored for future use in confirming the user's identity.

A microphone and speakers 220 may be used to allow a user to orally communicate with the money transfer service provider. Such communication may be with a customer service representative or an interactive voice response system. The speakers may also allow for auditory prompts (e.g., spoken instructions) to be made regardless of whether the user may respond orally. The speakers may be the vehicle's entertainment system's speakers. A microphone may be added to the vehicle to allow for oral communication or may be present in the vehicle to allow for interaction with various voice-activated systems.

The vehicle may also have a user input device 225. The user input device 225 may be one or more buttons or some other physical or electrical switches that a user may trigger in order to initiate and conduct the money transfer. For example, pressing a dedicated button on the vehicle's dash or ceiling may connect the user to a customer service representative of the money transfer service provider. In some embodiments, the user may navigate through a series of prompts or menus on a vehicle's entertainment and/or navigation system to arrive at an option to conduct a money transfer transaction. In some embodiments, the input device 225 may be a mouse (or mouse-like device), a trackball, or some other pointing device used in conjunction with a display screen. In some embodiments, the user may be able to issue spoken commands to an interactive voice response (IVR) system of the vehicle. The user input device may allow for a user to type or otherwise input various information pertinent to identifying the user and providing the necessary information for the money transfer process. Such a user input device 225 may be in the form of an onscreen keyboard or other typing arrangement allowing the user to input information such as a username, password, recipient's name, recipient's location, transaction amount, etc. In some embodiments, the same user input device or devices that allow the user to input information into the vehicle's entertainment, navigation, and/or climate systems (collectively referred to as on-board electronic systems) may be used by the user to provide information for a money transfer transaction.

The vehicle may also have a storage device 230. Such a storage device may be used to store user information for use in confirming the user's identity. For example, the storage device 230 may store the user's username, password, image, voiceprint, seat position, weight, previous money transfer transactions, and/or any other information pertinent to confirming the user's identity. The storage device 230 may be any type of computer-readable storage device. In some embodiments, flash memory is used. In some embodiments, a hard drive is used. In some embodiments, the storage device 230 is not dedicated to money transfer information. For example, the storage device 230 may also be used to store radio preset data, music, maps, videos, and/or any other information that vehicle occupants may wish access to. Storage device 230 may also store an identifier particular to the vehicle. This identifier may be transmitted to the money service provider whenever a money transfer transaction is conducted by the user. This identifier may be linked to the vehicle such that the money transfer service provider can identify the vehicle and possibly a user linked to that vehicle when the identifier is received. Using this identifier either alone or in conjunction with a jurisdiction's (e.g., a state's) motor vehicle records, may enable an operator (such as operator 125 of FIG. 1) and/or a money transfer service provider (such as money transfer service provider 130 of FIG. 1) to identify the vehicle, owner of the vehicle, and/or a user attempting to complete a money transfer transaction.

An ignition device 235 may also be used to assist in confirming the user's identity. Such a device may determine whether a particular key, known to be held by the user, is inserted in the vehicle's ignition. Such a key may also function wirelessly, possibly using RFID technology. During the money transfer process, the user may be prompted to insert her vehicle key if she has not already done so.

The vehicle may also have an entertainment system, navigation system, and/or climate system 240. Various portions of these systems may be used to assist in confirming the user's identity and allow the user to conduct a money transfer transaction. For example, the user may use the same physical buttons of the navigation system to input information for the money transfer transaction. Such systems may also be used to authenticate the user's identity. The user may be prompted to insert her "password disc," which may be a music compact disc the user has preselected to use to authenticate her identity. The user may also enter a particular address into the navigation system that may serve as a password to conduct the money transfer transaction. As another example, the volume knob of the entertainment system may be used to input a password, such as in the form of a combination lock. With such a combination lock type system, the user may turn the volume knob in one direction to a particular volume (or other number) setting, then the other direction to a different volume settling, and then back again in the other direction to a third volume setting. Such a method of inputting a password may imitate a combination lock and be particularly fitting to money transfers, as it gives the impression of opening a safe or vault.

The vehicle may also have a controller device 245. Such a controller device may be a processor devoted to managing money transfer transactions or may be a multi-purpose processor that controls multiple vehicle systems, such as the vehicle's entertainment system and/or navigation system. The controller device 245 may interact with any of the various systems of the vehicle described, such as the storage device 230 and the user input device 225. The controller device 245 may be a commercially available processor or may be specially designed for operation within a vehicle.

A wireless transmitter 250 may be present on the vehicle. Such a wireless transmitter 250 may allow various systems present on the vehicle to communicate with the money transfer service provider. For example, referring to FIG. 1, wireless transmitter 250 may allow for communication between systems on vehicle 110 and money service provider 130 via wireless network 120. Wireless transmitter 250 may utilize existing analog and digital cellular networks. In some embodiments, wireless transmitter 250 may operate via satellite phone networks.

Further, other monitoring devices may be present, such as a driving characteristics monitoring device 255. Such a device may monitor various driving habits of a user, assuming the user is driving the vehicle. For example, the driving characteristics monitoring device 255 may monitor characteristics such as typical rate of acceleration, a typical rate of deceleration, lane changes, amount of coasting, and/or any other driving characteristic which may be useful in identifying a particular user. These characteristics may be compared to previously imported or recorded driving characteristics at the vehicle or the money transfer service provider to assist in confirming the identity of the user. For example, in addition to an image being taken of the user, the user's driving characteristics may be compared to previous recorded driving characteristics and attempt to authenticate the user's identity.

Another device which may be present to help authenticate the identity of the user is a biometric device 260. One or more biometric devices may be present. In some embodiments, the biometric device is a voiceprint identifier. A voiceprint identifier may be able to receive a sample of the user's voice, such as a spoken sentence or word, and determine whether the spoken sentence or word was spoken by the user. This may involve comparing the spoken sample to a previous sample, and/or analyzing the samples for various characteristics particular to the user. During a money transfer transaction, the user may be prompted to provide a voiceprint. In some embodiments, the voiceprint may be gathered from user-issued commands, such as if the user said: "Vehicle, conduct a money transfer." The voiceprint sample may be transmitted to the money transfer service provider for comparison to previously supplied voiceprint information. In some embodiments, the voiceprint is compared to previously collected voiceprint data stored onboard the vehicle at storage device 230.

Another biometric device 260 that may be present is a fingerprint scanner. A fingerprint scanner may be incorporated into the dashboard, or any other location, of the vehicle and may be easily accessible by the user whether located in the driver's seat or the passenger's seat. During a money transfer transaction, the user may be prompted to swipe a finger over the fingerprint scanner. The resulting scan may be transmitted to the money transfer service provider for comparison to a previously collected fingerprint, or may be compared on board the vehicle to a previously collected fingerprint stored on storage device 230.

An additional biometric device 260 that may be present is a retinal scanner. A retinal scanner may scan the user's retina during a money transfer transaction. The scan may be transmitted to the money transfer service provider to be compared to a previously collected retina scan. In some embodiments, the scan may be compared to a previously collected retina scan stored in storage device 230 on-board the vehicle. As those of skill in the art will understand, a voiceprint identifier, a fingerprint scanner, and a retinal scanner are only three possible biometric devices which may be used; other biometric devices may be possible.

Yet another device which may be used to assist in confirming the user's identification is a keyless entry device 265. Such a keyless entry device may be a standard battery powered key fob typically used to gain access to the vehicle. During a money transfer transaction, the user may be prompted to trigger her keyless entry device. This may assist in confirming the user's identity because only a vehicle's owner or another party provided access to the vehicle would likely have keyless entry device 265.

Figure 3:
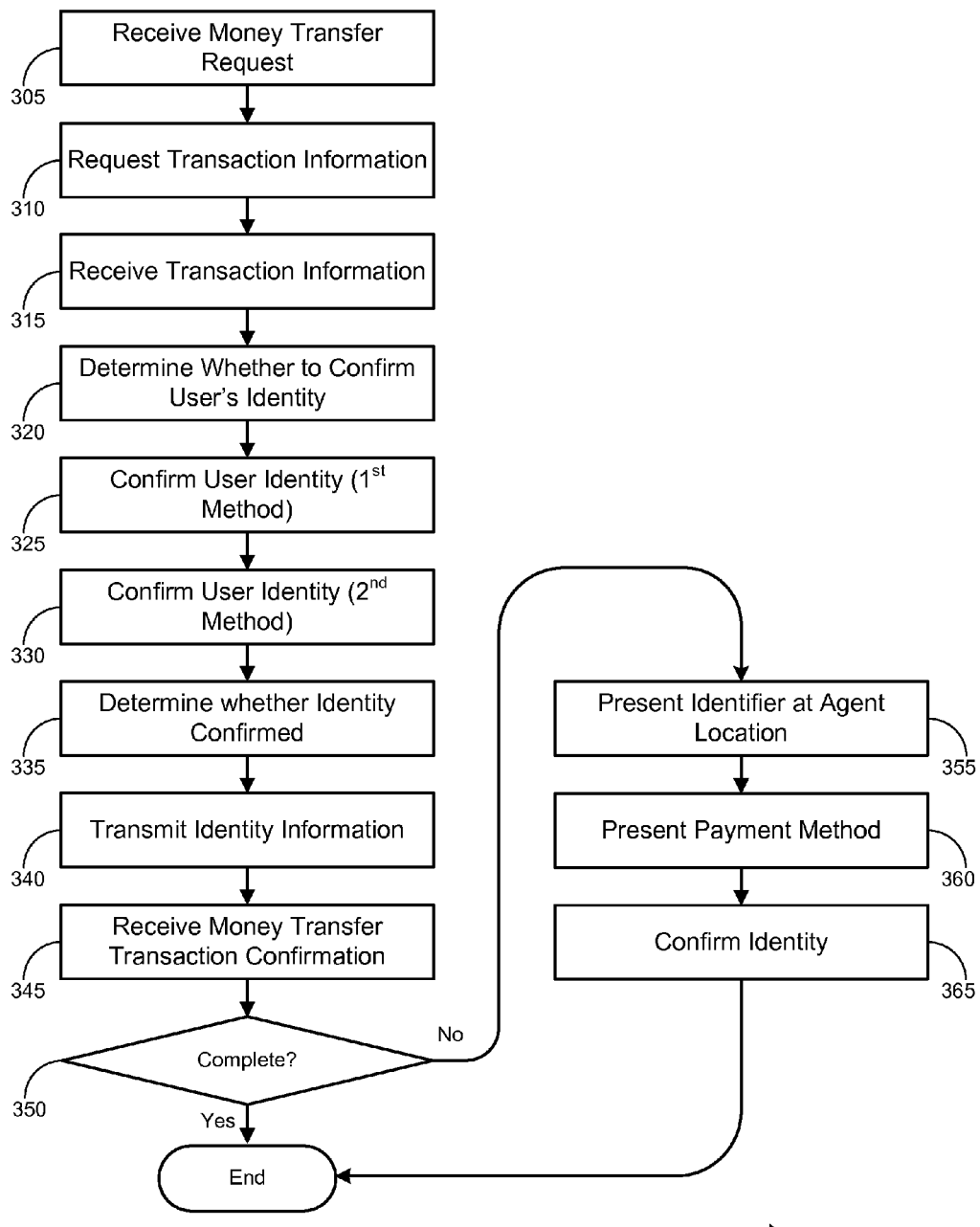
FIG. 3 illustrates a simplified process of conducting a money transfer transaction and confirming the user's identity in a vehicle.

One or more of such systems of a vehicle may be utilized in various processes to conduct a money transfer transaction from a vehicle and authenticate the user's identity. FIG. 3 illustrates a simplified method 300 of conducting a money transfer transaction and confirming the user's identity in a vehicle. Such a method may utilize vehicle systems such as those systems illustrated in FIG. 2. Alternatively, the method of FIG. 3 may utilize different vehicle systems to authenticate the user's identity than those illustrated in FIG. 2. It is important to note that method 300 may be used for such functions as bill payment instead of a (person-to-person) money transfer transaction. Such a method may allow for a user to send payments to entities which the user has a preexisting relationship, such as a mortgage lender, utility provider (gas, electric, sewer, water, cable, internet, phone, etc.), credit card company, etc. The user may be provided with reminders in her vehicle and may then be given the option of completing the bill payment transaction in accordance with the following.

At block 305, a money transfer request may be received from the user by a system of the vehicle. This money transfer request may be transmitted to a money transfer service provider. In some embodiments, the money transfer service provider will not be notified until further data is collected from the user. The request to conduct a money transfer may be received by the vehicle in the form of a button being depressed, a menu item being selected, a voice command being issued, or any other possible method a user could use to specify that she wishes to conduct a money transfer transaction. Besides a money transfer to another person, the user may instead request that a stored value account, tied to a stored value card, be credited an amount of funds. This stored value card may be held by the user or any other person.

Various transaction information may be requested from the user at block 310. This transaction information may be requested by the money transfer service provider via the wireless network, or may be requested by a vehicle system. This information may be requested orally by the customer service representative of the money transfer provider, or by an interactive voice response system. Alternatively, the information may be requested via a display within the vehicle (e.g., part of the navigation and/or entertainment system), or by an audio prompt. Various pieces of information which may be gathered are: the user's name, a username, password, the recipient's name, the recipient's address, the recipient's bank account number, the user's bank account number, the method of payment the user intends to use, the amount of the transfer, the country the recipient is located in, etc.

At block 315, some or all of these pieces of transaction information may be received. Information may be received locally at a system of the vehicle, such as storage device 230, and stored or may be transmitted to the money transfer service provider. If the user is attempting to load funds to a stored value card, this transaction information may include an identifier that identifies the stored value card. Further, as previously described, much of the transaction information may already have been input by the user at an earlier time from locations such as an agent location or a home computer.

At block 320, a determination may be made as to whether the user's identity needs to be confirmed. In some embodiments, the user's identity may only need to be confirmed if the amount of the user's transaction is above a threshold amount, or the transfer involves a recipient outside of the country. Also, a user may not need to have her identity confirmed within the vehicle if the user will be conducting part of the transaction at an agent location. The determination of whether to authenticate the user's identity may be completed by a system of the vehicle, such as a controller, or may be completed by the money transfer service provider.

If the user's identity is to be confirmed, at block 325 the user's identity may be confirmed using a first method. The first method of user identity authentication may be the only method performed, or may be the first in a series of multiple steps to authenticate the user's identity. The first method of identity authentication may utilize any of the systems previously described in relation to FIG. 2. For example, a picture may be taken of the user, a voiceprint may be collected from the user, a fingerprint or other biometric identifier may be collected. Further, a username and password may be collected. The first method of identity authentication may serve to be a primary identity authentication method. A primary identity authentication method may be sufficient on its own (without additional forms of authentication) to accurately authenticate the user's identity.

At block 330, the user's identity may be authenticated using a second method. The second method of identity confirmation may be performed concurrently with the first method of block 325. The second method of identity authentication may utilize any of the systems previously described in relation to FIG. 2 or in relation to the first method of identity authentication. The second method of identity authentication may also serve as a primary identity authentication method, and may be sufficient on its own to authenticate the user's identity. In some embodiments, the second method used to authenticate the user's identity is a secondary identity authentication method. A secondary identity authentication method may not be sufficient on its own to authenticate the user's identity, but may still be useful in providing further evidence of the user's identity, especially when used in conjunction with a primary identity authentication method. An example of a secondary identity authentication method may be the user's weight and/or seat position, possibly gathered by seat weight/position sensor 215 of FIG. 2. Other possible secondary identity authentication methods include observing the user's driving characteristics (such as device 255 of FIG. 2), whether the user possesses a keyless entry device (such as by device 265 of FIG. 2), and whether the user's key is inserted in the ignition (such as ignition device 235 of FIG. 2). One or more secondary identity authentication methods may be used in conjunction with one or more primary identity authentication methods. While FIG. 3 illustrates the use of two identity authentication methods, one, three or more than three identity authentication methods may be used.

At block 335, a determination as to whether the user's identity has been successfully confirmed may be made. Such a determination may be made on board the vehicle, such as by controller device 245, or, if the identity authentication information is transmitted, the determination may be made at the money transfer service provider. The user's identity may be considered confirmed if both the first and second methods of user identity authentication agree as to the user's identity. In some embodiments, if more than two user identity authentication methods are used, only a majority of identity authentication methods need to agree as to the user's identity. If multiple identity authentication methods do not agree on the user's identity, the user may be requested to provide additional information, or may be requested to travel to an agent location to complete the money transfer transaction. If at block 335 the user's identity is not confirmed, the method may end, or the user may be instructed to travel to an agent location or contact a customer service representative for further assistance.

At block 340, some or all of the identity information gathered at blocks 325 and 330 may be transmitted to the money transfer service provider. In some embodiments, only an indication that the user's identity was successfully confirmed is transmitted to the money transfer service provider. Such identity information may be further compared to previous identity information of the user stored at the money transfer service provider. The transmitted identity information may be stored at the money transfer service provider for future reference.

At block 345, a authentication may be sent to the vehicle from the money transfer service provider confirming that the money transfer transaction has been completed successfully. This confirmation may include a confirmation code being sent to the vehicle. For example, such a confirmation code may be used to prove that money was transferred, such as for a bill payment transaction. Such a code may also be automatically transmitted to multiple vehicles if indicated as such in the user's profile with the money transfer service provider. If the money transfer transaction is only staged from the vehicle, the authentication may indicate that the money transfer transaction has been successfully staged and for the user to proceed to an agent location of the money transfer service provider to complete the transaction. At block 345, the authentication may include a transaction number or some other form of identifier being sent to the vehicle. This identifier may be presented to the user and/or stored at the vehicle (such as in storage device 230).

At block 350, if the money transfer transaction is complete, the process may end. If the money transfer transaction has been staged, the process may continue to block 355. At block 350, a user may also be presented with a display or other indication of the nearest agent location or multiple nearby locations where the user may complete the transaction.

At block 355, for a staged transaction, the user may then present her name, username, and/or an identifier, such as a transaction number, sent to the vehicle, possibly at block 345, at an agent location. At block 360, the user may present payment for the money transfer to the clerk at the agent location. This payment may be in cash or any other form of payment, such as check, money order, credit card, a direct transfer from a bank account, debit card, or stored value card. If the user's identity was not successfully confirmed at blocks 325 and 330, the user's identity may be confirmed by a clerk at the agent location at block 365. For example, the user may be required to present identification, such as a driver's license. The clerk may also have access to the information gathered at the vehicle from blocks 325 and 330. For example, the clerk may be able to view a picture of the user taken in the vehicle to determine whether the person initiating the money transfer transaction from the vehicle was the same person.

Figure 4:
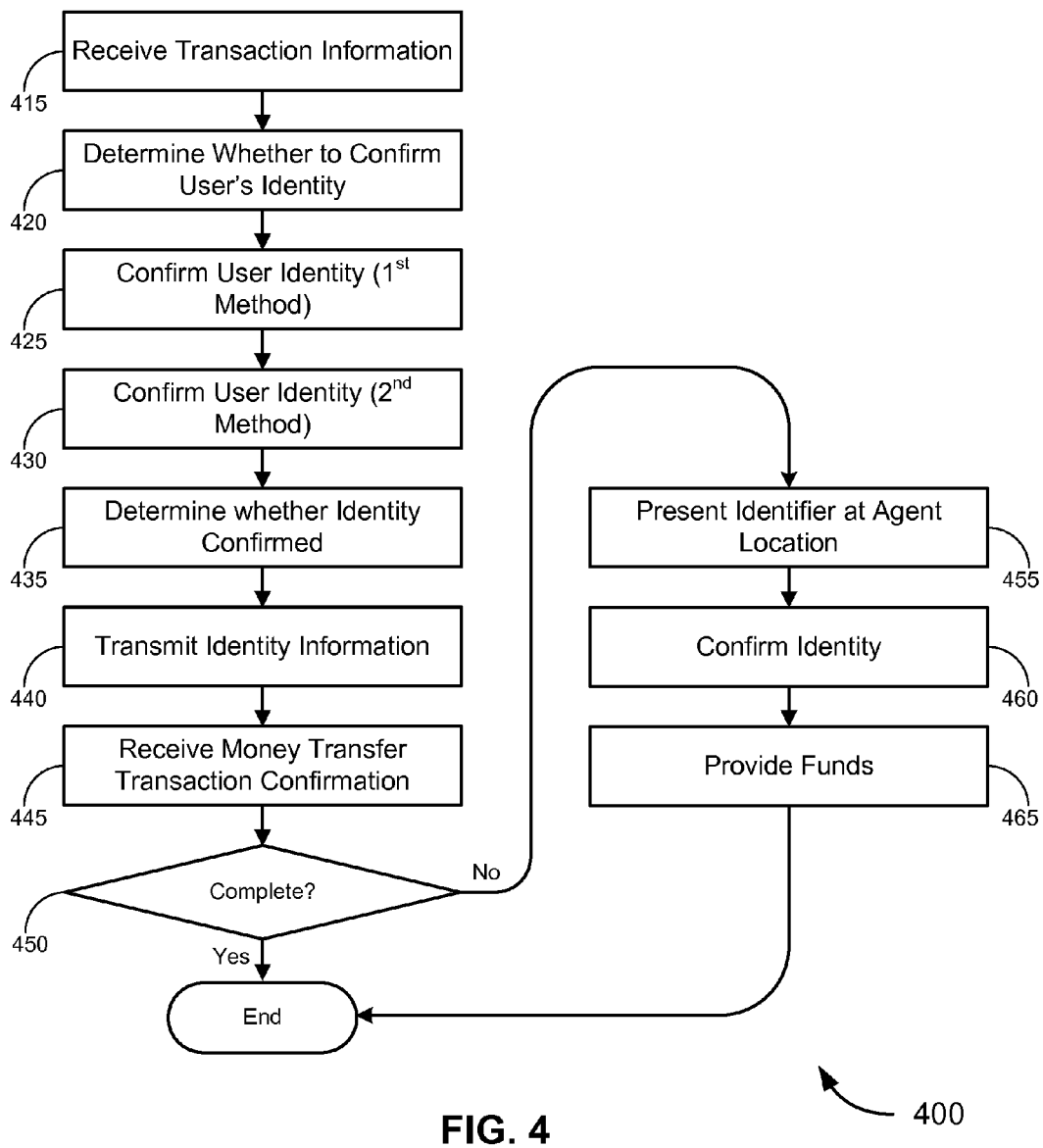
FIG. 4 illustrates a simplified process of receiving a money transfer transaction and confirming the user's identity in a vehicle.

A similar method may be used for a user to receive funds through a money transfer transaction at her vehicle. FIG. 4 illustrates a simplified process 400 of receiving a money transfer transaction and confirming the user's identity in a vehicle. At block 415, one or more of the vehicle's systems may receive information from a money transfer service provider regarding a money transfer transaction intended for a user of the vehicle. The information regarding the money transfer transaction may be sent to the vehicle because the user has previously linked the vehicle to her account held with the money transfer service provider. In some embodiments, the sender of the money transfer transaction may be able to specify that the user is to be notified at her vehicle of the money transfer transaction. The transaction information received at the vehicle from the money transfer service provider may be displayed, announced, or otherwise presented to the user via any of the previously described vehicle systems. For example, a display in the vehicle may indicate that a money transfer transaction has been received, with information regarding the sender, the amount, and/or the location of the transaction was sent from displayed in the vehicle to the user. In some embodiments, similar information may be announced via the vehicle's entertainment/sound system.

For a money transfer transaction being received by a user in a vehicle, it may be necessary to confirm her identity to ensure the proper party is receiving the money transfer transaction. Blocks 420-440 relate to confirming the user's identity. These blocks may proceed similarly to blocks 320-340 of FIG. 3. At block 445, confirmation of the money transfer transaction may be received. The confirmation may be presented to the user using any of the vehicle's systems previously described. This confirmation may indicate that the money transfer transaction is complete and that the funds associated with the transaction have been deposited into an account of the user. This confirmation may also include an identifier that identifies the money transfer transaction. If the user desires, or is required to, the reception of the money transfer transaction may be completed in person by the user at an agent location. The user may be able to request that funds associated with the money transfer transaction be picked up in person at an agent location.

If the confirmation signals the end of the money transfer transaction, the transaction may complete at block 450. Otherwise, if the user desires to complete the money transfer transaction at an agent location (perhaps because she wishes to receive the money in cash) and/or is required to further confirm her identity, the user may proceed to block 455 from block 450. Also at block 450, the user may be presented with a display screen or other indicator of the nearest agent location or multiple nearby agent locations where the user may complete the transaction.

At the agent location, the user may be required to present the identifier received at the vehicle at block 455. The agent may use this identifier to locate the money transfer transaction. If necessary, at block 460, the user's identity may be further confirmed. The money transfer transaction provider may compare stored identity information and/or information received from the vehicle-based confirmation methods to the user. For example, a picture on file may be compared with a picture received from the vehicle. Both of these pictures may be compared to the actual user at the agent location.

At block 465, if the user's identity has been confirmed, the funds may be provided to the user. The funds may be in the form of cash, check, stored-value card, direct deposit, money order, etc.

Figure 5:
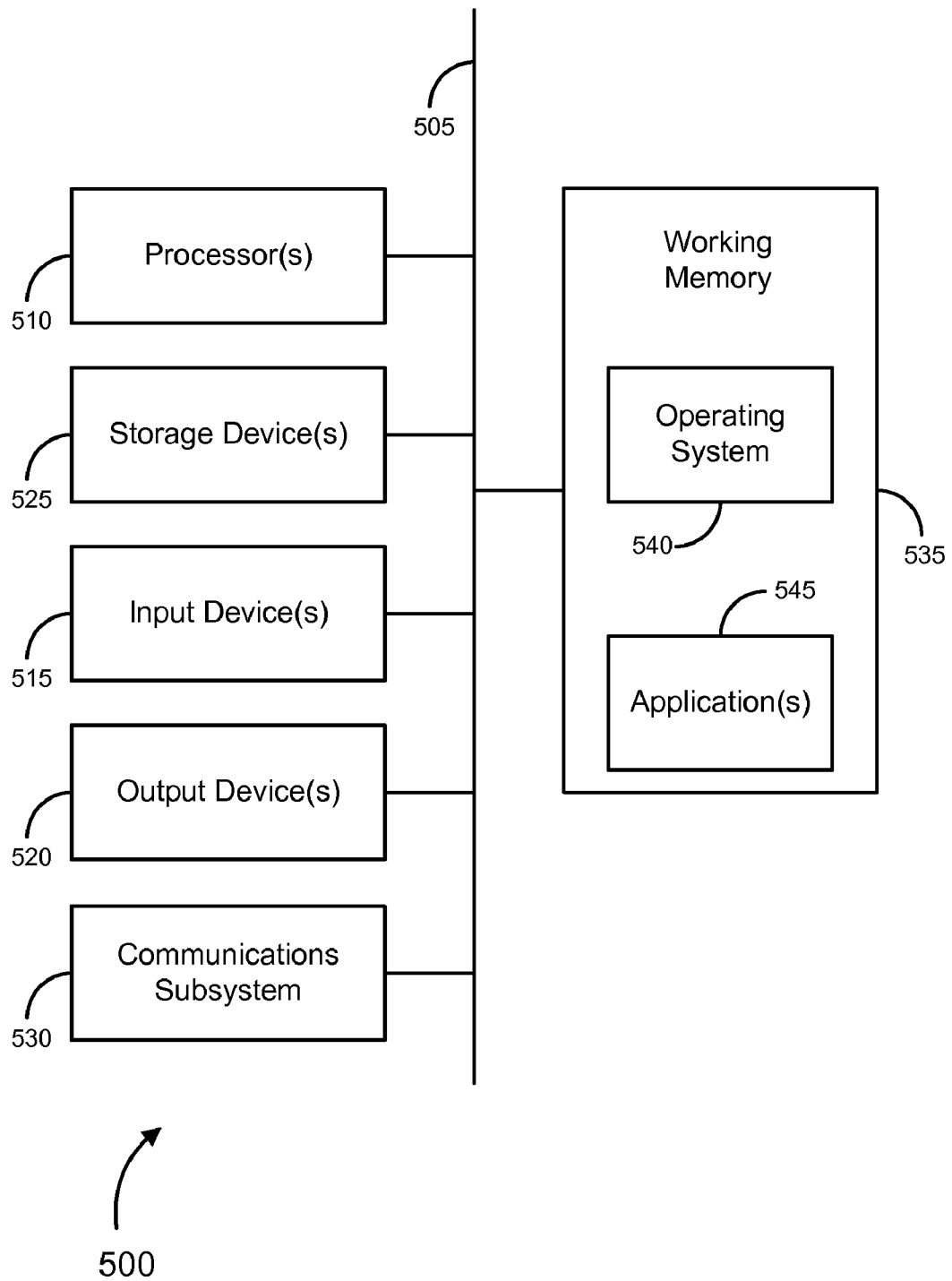
FIG. 5 illustrates a simplified block diagram of a computer system that may serve as the processor and/or the host computer system of the money transfer service provider.

The previously described processor that may be on-board a vehicle may be part of a computer system. Also, the host computer system of the money transfer service provider may also be described as follows. FIG. 5 provides a schematic illustration of one embodiment of a computer system 500 that can perform the methods provided by various other embodiments, as described herein, and/or can function as the processor on-board the vehicle and/or the host computer system of the money transfer service provider. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details.

For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An integrated vehicle-based system for authenticating a user's identity and conducting a money transfer transaction, the system comprising:
   a vehicle, the vehicle comprising an on-board electronic system;
   a wireless transmitter on board the vehicle for remotely communicating with a money transfer system;
   a user-input device integrated with the on-board electronic system, wherein the user-input device is configured to interface with the money transfer system using the wireless transmitter; and
   a first identity authentication device and a second identity authentication device integrated with the vehicle that are each configured to collect information for confirming the user's identity, wherein:
      the first identity authentication device comprises a camera, the camera being configured to capture an image of the user and cause the image to be transmitted to the money transfer system via the wireless transmitter for comparison to a stored image of the user stored by the money transfer system;
      the second identity authentication device is integrated with the user's seat, and is configured to measure the user's weight and cause the user's weight to be transmitted to the money transfer system via the wireless transmitter for comparison to a stored weight of the user; and
      the money transfer transaction is configured to be conducted from the vehicle using the wireless transmitter and the user-input device following successful authentication by the money transfer system using the image of the user from the first identity authentication device and the user's weight from the second identity authentication device.

2. The system of claim 1, wherein the money transfer transaction is a bill payment transaction.

3. The system of claim 1, wherein the user-input device is configured to receive a username from the user.

4. The system of claim 3, wherein the user-input device is configured to receive a password from the user.

5. The system of claim 4, wherein the user-input device is configured to receive the password from the user via a control knob of the vehicle, the control knob is controlled by a user rotating the knob clockwise and counterclockwise to input the password, and the password is a series of numbers.

6. The system of claim 1, wherein the user-input device is configured to allow a user to talk with a representative of the money transfer system.

7. The system of claim 1 further comprising a third identity authentication device capable of collecting information to further assist in confirming the user's identity.

8. The system of claim 7, wherein the third identity authentication device is further configured to determine the position of the user's seat.

9. The system of claim 1, further comprising a third identity authentication device that is a sensing device configured to determine whether a key is present and is linked to the user's identity.

10. The method of claim 1, wherein the first identity authentication device comprises a computer-readable storage device, the computer readable storage device configured to store the stored image of the user.

11. The system of claim 1, wherein the camera of the first authentication device is configured such that the camera cannot be pointed in the direction of the driver's seat.

12. A method for authenticating a user's identity using integrated vehicle systems, the method comprising:
   providing a vehicle with integrated information gathering systems;
   receiving, by an input system of the vehicle, a request to conduct a money transfer transaction from a user;
   performing a first authentication, using a first identity-authentication system, of the user's identity, wherein:
      the first identity-authentication system comprises a camera,
      performing the first authentication includes:
         the camera being used to capture an image of the user; and
         comparing a locally-stored image of the user with the captured image; and
         transmitting to a host computer system of a money transfer provider the image of the user;
   performing a second authentication, using a second identity-authentication system, of the user's identity, wherein
      performing the second authentication includes:
         measuring the user's weight using a device integrated with the user's seat; and
         transmitting the user's weight to the host computer system of the money transfer provider for comparison to a stored weight of the user stored by the host computer system of the money transfer service provider;
   receiving a response from the host computer system linked to the money transfer provider indicating that the user's identity has been authenticated; and after receiving the response from the host computer system, conducting at least a first portion of the money transfer transaction by the user from the vehicle.

13. The method of claim 12, further comprising informing the user of a location of at least one agent location close to the vehicle's location.

14. The method of claim 12, further comprising, before receiving the request to conduct the money transfer transaction, receiving, at the vehicle, a reminder of a bill payment due.

15. The method of claim 12, wherein the input system of the vehicle comprises a microphone and speaker, wherein the request to conduct a money transfer transaction comprises oral communication via the microphone and speaker with a customer service representative of the money transfer provider.

16. The method of claim 12, wherein confirming authenticating the user's identity using a third identity-authentication system comprises a collection of a voiceprint from the user.

17. The method of claim 16, further comprising comparing the voiceprint of the user to a stored voiceprint.

18. The method of claim 12, further comprising: receiving, via the wireless transmitter, a transaction identifier of the money transfer transaction; and presenting, at an agent location of the money transfer provider, the transaction identifier, wherein the presentation comprises a second portion of the money transfer transaction.

19. The method of claim 12, wherein the camera is configured such that the camera cannot be pointed in the direction of the driver's seat.

20. A vehicle-based system for determining a user's identity to complete a wireless money transfer transaction from a vehicle, the system comprising:

a user-input system;
a first user-authentication system integrated with the vehicle's driver seat, wherein
   the first user-authentication system is configured to measure a weight of the user;
a second user identification system integrated with the vehicle's sound system, wherein
   the second user identification system is configured to:
     produce auditory messages through the sound system's speakers; and
     receive voiceprint data through a microphone;
a wireless transmitter that communicates with a money transfer service provider via a wireless network;
a controller system, where the controller system is configured to:
   cause the measured weight of the user to be transmitted to a host computer system of a money transfer service provider via the wireless transmitter for comparison with a stored weight of the user; and
   cause voiceprint data to be transmitted via the wireless transmitter to the host computer system of the money transfer service provider for comparison with stored voiceprint data corresponding to the user.

21. The system of claim 20 wherein the money transfer transaction is a bill payment transaction.

22. The system of claim 20 further comprising a third user-authentication system comprising a camera that takes an image of the user, wherein the controller system transmits at least some portion of the image via the wireless transmitter to the money transfer service provider.

23. The system of claim 22, wherein the camera of the third user-authentication system is configured such that the camera cannot be pointed in the direction of the driver's seat.

* * * * *